United States Patent
Black

(10) Patent No.: US 7,239,622 B2
(45) Date of Patent: Jul. 3, 2007

(54) MODIFIED SCHEDULING TECHNIQUE FOR A TELECOMMUNICATION SYSTEM

(75) Inventor: Peter J. Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1050 days.

(21) Appl. No.: 10/251,938

(22) Filed: Sep. 19, 2002

(65) Prior Publication Data
US 2004/0057398 A1 Mar. 25, 2004

(51) Int. Cl.
*H04Q 7/24* (2006.01)
*H04B 7/212* (2006.01)

(52) U.S. Cl. ............... 370/338; 370/347; 370/337; 370/321

(58) Field of Classification Search ............ None
See application file for complete search history.

(56) References Cited

U.S. PATENT DOCUMENTS

| | | | |
|---|---|---|---|
| 5,734,646 A * | 3/1998 | I et al. | 370/335 |
| 6,088,335 A * | 7/2000 | I et al. | 370/252 |
| 6,275,486 B1 * | 8/2001 | Edwards et al. | 370/347 |
| 6,400,704 B2 * | 6/2002 | Mikuni et al. | 370/347 |
| 6,597,705 B1 * | 7/2003 | Rezaiifar et al. | 370/468 |
| 2001/0001609 A1* | 5/2001 | Mikuni et al. | 370/337 |
| 2002/0001609 A1* | 1/2002 | Calhoun et al. | 424/426 |
| 2005/0181814 A1* | 8/2005 | Okamoto et al. | 455/517 |

FOREIGN PATENT DOCUMENTS

EP 1091609 A1 4/2001

* cited by examiner

*Primary Examiner*—Chirag G. Shah
(74) *Attorney, Agent, or Firm*—Thomas R. Rouse; Charles D. Brown; Kent D. Baker

(57) ABSTRACT

Biasing and scheduling transmission of data for access point transceivers. A transmission period of the transceivers is biased in adjacent cells into a plurality of time slots such that the biasing reduces interference among adjacent cells. The transceivers are then scheduled to transmit data packets during a selected time slot of the plurality of time slots that is distinct from each other.

17 Claims, 13 Drawing Sheets

MODIFIED SCHEDULING TECHNIQUE FOR A TELECOMMUNICATION SYSTEM

BACKGROUND

1. Field

The present invention relates generally to telecommunication systems, and more specifically to scheduling techniques in such systems.

2. Background

Third-generation (3G) data services for both code-division multiple access 2000 (cdma2000) and wideband code-division multiple access (WCDMA) were designed around a physical layer framework that was optimized for voice transport. Voice services are characterized by symmetric traffic loading (between the forward link and the reverse link) and guaranteed quality of service (latency, delay, etc.). Packet data services, however, are characterized by asymmetric traffic loading that involves short messages (e.g., requests for data) and very long messages (e.g., data downloads). Therefore, using a voice-traffic optimized system for packet data services results in degradation of spectral efficiency or reduction in the economics of such services.

Consequently, Third-Generation Partnership Project 2 (3GPP2) has adopted an evolutionary approach to the existing cdma2000 standard for wireless Internet services. The high data rate (HDR) system, also known as 1×evolution (1×EV) Phase 1, is an evolution of the cdma2000 family of standards and is designed to provide an air interface for packet data applications such as wireless Internet with peak rates of up to 2.4 Mbps.

The 1×EV forward link includes the pilot channel, the medium access control (MAC) channel, the forward traffic channel and the control channel. The traffic channel carries user data packets. The control channel carries control messages and may carry user traffic. These channels are time division multiplexed in order to support accurate pilot-based signal-to-interference-and-noise ratio (SINR) measurements at the mobile, to support full power transmission of the traffic channel to a single mobile, and to support code division multiplexing of the low data-rate MAC channels.

Adjacent cells in an HDR system are typically allocated the same frequency. However, the adjacent cells may not interfere with each other because cells use different codes that are orthogonal to each other.

Unfortunately, interference does occur in an HDR system for a number of reasons. Antenna patterns, power levels, scattering, and wave diffraction can differ from cell to cell. Buildings, various other structures, hills, mountains, foliage, and other physical objects can cause signal strength to vary over the region covered by a cell and to create multipath. Consequently, the boundaries at which the signal strength of a channel falls below a level sufficient to support communications with a mobile can vary widely within a cell and from cell to cell. For this reason, cells adjacent one another do not typically form the precise geometric boundaries. Since cell boundaries must overlap to provide complete coverage of an area and allow handoff, and because the boundaries of cells are imprecisely defined, signals will often interfere with one another. This is especially true when a sectored cell pattern is used, because the transmitters in each of the cells are much closer to one another than in a simple cell pattern. Further, although the system may be less than fully loaded, the existing scheduler may needlessly schedule transmission in adjacent cells or sectors simultaneously because transceivers of the adjacent cells are typically configured to transmit starting at the same point in time.

FIG. 1 shows example timelines of conventional schedulers that schedule transmission times for four transceivers (i.e., transceivers 1–4) of adjacent cells. As can be seen, the conventional schedulers typically schedule transmission times for the four transceivers in the adjacent cells within a particular time period (e.g. T) starting at the same point in time (e.g.,$\tau_0$) regardless of the amount of data to be transmitted for each transceiver. The overlapping of the transmission times, which are scheduled by conventional schedulers, occurs because the transceivers of the adjacent cells transmit data substantially simultaneously. For example, in FIG. 1, the base station transceivers in cells 1 and 3 have only about a quarter of T worth of data to be transmitted (i.e., approximately 25% loaded) during the first T period while the base station transceivers in cells 2 and 4 have about a third of T worth of data to be transmitted (i.e., approximately 33% loaded). Nevertheless, the transmissions are scheduled to begin at the same time. Thus, in this configuration, interference between the cells at the boundaries may be relatively high because, for a significant portion of the transmission period (T), all four transceivers are simultaneously transmitting.

There is therefore a need in the art for a modified scheduling technique in transmission of data packets among adjacent cells in such a way as to reduce interference, especially when the system is not fully loaded.

SUMMARY

Embodiments disclosed herein address the above stated needs by biasing a transmission period among adjacent cells in a cellular network, and scheduling transmission of data for transceivers in such a network.

In one aspect, access point transceivers in adjacent cells are biased for transmission over a plurality of time slots such that the biasing reduces the likelihood of simultaneous transmission and thereby reduces interference among adjacent cells. The transceivers are scheduled to transmit data packets during a biased time slot of the plurality of time slots such that each transceiver is scheduled for a time slot that is distinct from the others. The transceiver biasing can include dividing a transmission period for all transceivers being biased into the plurality of time slots based on an average transmission load of the adjacent cells. The scheduling to reduce interference can include generating transmission probabilities for the transceivers during the selected time slot, generating a random number at the start of a time slot for each transceiver, and comparing the random number with the transmission probabilities for the transceivers. The data packets are transmitted when the transmission probability of a transceiver is greater than the random number so that during a substantial portion of the selected time slot only one transceiver that is biased to transmit during the selected time slot is likely to be transmitting. In some cases, an intra-cell bias may be performed, in addition to the "inter-cell" bias described above, such that, within a cell, transmission to remote stations within a weak coverage area is provided with a higher probability during the selected time slot than during other time slots. Thus, interference between transceivers is reduced.

In another aspect, a wireless communication system includes a plurality of transceivers, including a first transceiver and other transceivers, located in adjacent cells. The system also includes a biasing element and a plurality of schedulers corresponding to the transceivers. In accordance with the invention, the biasing element biases transceivers to transmit over a plurality of time slots to reduce the likelihood of simultaneous transmission and reduce transmission interference among adjacent cells. Each scheduler schedules transmission of data packets during a biased time slot of the plurality of time slots that is distinct from the others.

DETAILED DESCRIPTION

Figure 1:
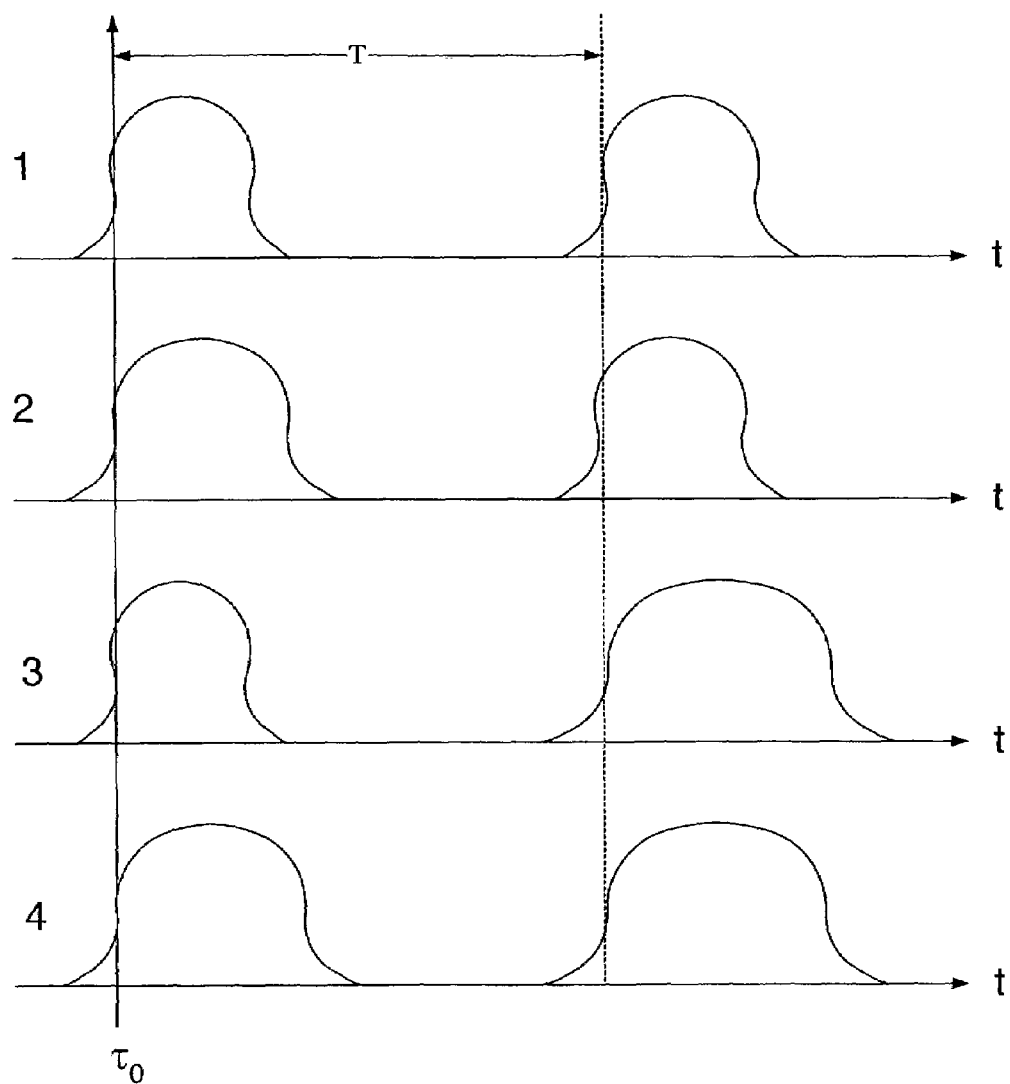
FIG. 1 illustrates a conventional biasing and scheduling technique for biasing and scheduling transmission of data packets from cell transceivers for adjacent cells α, β, and γ.

The word "exemplary" is used herein to mean "serving as an example, instance, or illustration." Any embodiment described herein as "exemplary" is not necessarily to be construed as preferred or advantageous over other embodiments.

The term "cell" used herein in the context of wireless communication refers to a coverage area of a stationary base station transceiver configured to transmit signals to and to receive signals from remote terminals. The term "sector" is typically used to refer to a subset of the cell. The term "cell" is used hereafter to refer to both cells and/or sectors within a cell.

In recognition of the above-stated difficulties associated with conventional scheduling of transmission times of transceivers located within the base stations of adjacent cells, this description describes exemplary embodiments for modified scheduling that keeps the transmission times of the transceivers in adjacent cells sufficiently apart to reduce interference among these adjacent cells (i.e., inter-cell interference). In particular, each transceiver of the adjacent cells, at the time of system configuration, is biased into a time slot that is distinct from the others in accordance with transmission loads or capacities of the cells so that each transceiver is more likely to transmit during the biased or selected time slot than other time slots such that its transmission will be sufficiently separated from transmissions of other transceivers. Thus, biasing is a means of allocating a transmission time of each transceiver to a time slot that is distinct from the other transceivers so that the transceivers in the adjacent cells do not transmit data substantially simultaneously (i.e., more likely to transmit during that biased time slot than any other time slot). For each transceiver in the adjacent cells, the scheduler is then more likely to schedule transmission of data within the biased time slot than any other time slot. Consequently, for purposes of illustration and not for purposes of limitation, the exemplary embodiments of the invention are described in a manner consistent with such use, though the invention is not so limited.

At system configuration, the base station transceivers in the adjacent cells may be time biased such that the transceivers are not likely to transmit data substantially simultaneously. That is, at system configuration, a number of adjacent cell transceivers is selected to be biased. The biasing includes dividing a transmission period (typically set to approximately 1.67 milliseconds in a CDMA system) into a number of time slots equal to the number of adjacent cell transceivers. The adjacent cell transceivers are then configured such that each of these transceivers is most likely to transmit its data within one time slot of the number of time slots. The time slot chosen for a particular transceiver is referred to as a "biased" or "selected" time slot and is different for each transceiver. The particular transceiver may transmit in time slots other than the biased time slot but only if some transmission load parameter such as a queue length increases to a certain point determined by a transmission probability. Thus, each transceiver has a transmission probability for each time slot that determines whether that transceiver should transmit during that time slot.

For example, transceivers in three adjacent cells may be biased with time biases of α, β, and γ, respectively, so that α, β, and γ represent probabilities of transmission for each respective cell, such that the time periods utilized by the corresponding base station transceivers do not substantially overlap. In the descriptions below, the transceivers that are time biased by α, β, and γ are sometimes referred to as cells α, β, and γ, respectively, for brevity. However, it should be understood that these designations refer to cells having base station transceivers with time biases of α, β, and γ. The biasing may be performed by a biasing element at system configuration, or may be dynamically adjusted by a base station controller during the operation of the transceivers.

Once the biasing is completed, a scheduler corresponding to each base station transceiver controls the transmission of data from the transceiver according to the biased transmission probabilities. Thus, the scheduler will typically schedule transmission of data from a particular transceiver during the biased time slot for that particular transceiver. The scheduler may also schedule transmission of data during other time slots based on transmission probabilities for that particular transceiver for other time slots based on some transmission load parameter such as a queue length. However, if the queue length for the particular transceiver is close to zero, the scheduler may not need to schedule transmission of data during slots other than the biased slot.

Typically, the scheduler resides in the stationary base station of a cell. Thus, the schedulers for adjacent cells are distributed so that each scheduler can operate independently without coordinating transmissions from adjacent cells. However, the scheduler may reside in the base station controller or some other entity (e.g., remote station) that is tied to all or some of the base stations in the adjacent cells. If the scheduler resides in the base station controller, the scheduler may have to coordinate scheduling of multiple transceivers in adjacent cells so that the transceivers in adjacent cells do not transmit simultaneously. In this case, the scheduling among adjacent cells may actually improve because the size of time slots may be dynamically adjusted according to the actual transmission load of the adjacent cells. If the scheduler resides in the remote station, the remote station should include at least a mechanism to control and coordinate transmission of data from the transceivers of adjacent cells.

In the three-adjacent-cell example described above, if a transceiver is biased by a time bias of $\alpha$ to transmit during a time slot $T_1$, then that transceiver will be scheduled to transmit data during the time slot $T_1$ with a transmission probability of 1. For transceivers in other cells (i.e., biased by time biases of $\beta$ and $\gamma$, respectively, to transmit during time slots $T_2$ and $T_3$), the probabilities of scheduling transmission of data during time slot $T_1$ depend on the data storage capacity of the cells $\beta$ and $\gamma$, such as queue lengths of data packets in those transceivers of cells $\beta$ and $\gamma$, respectively.

Figure 2:
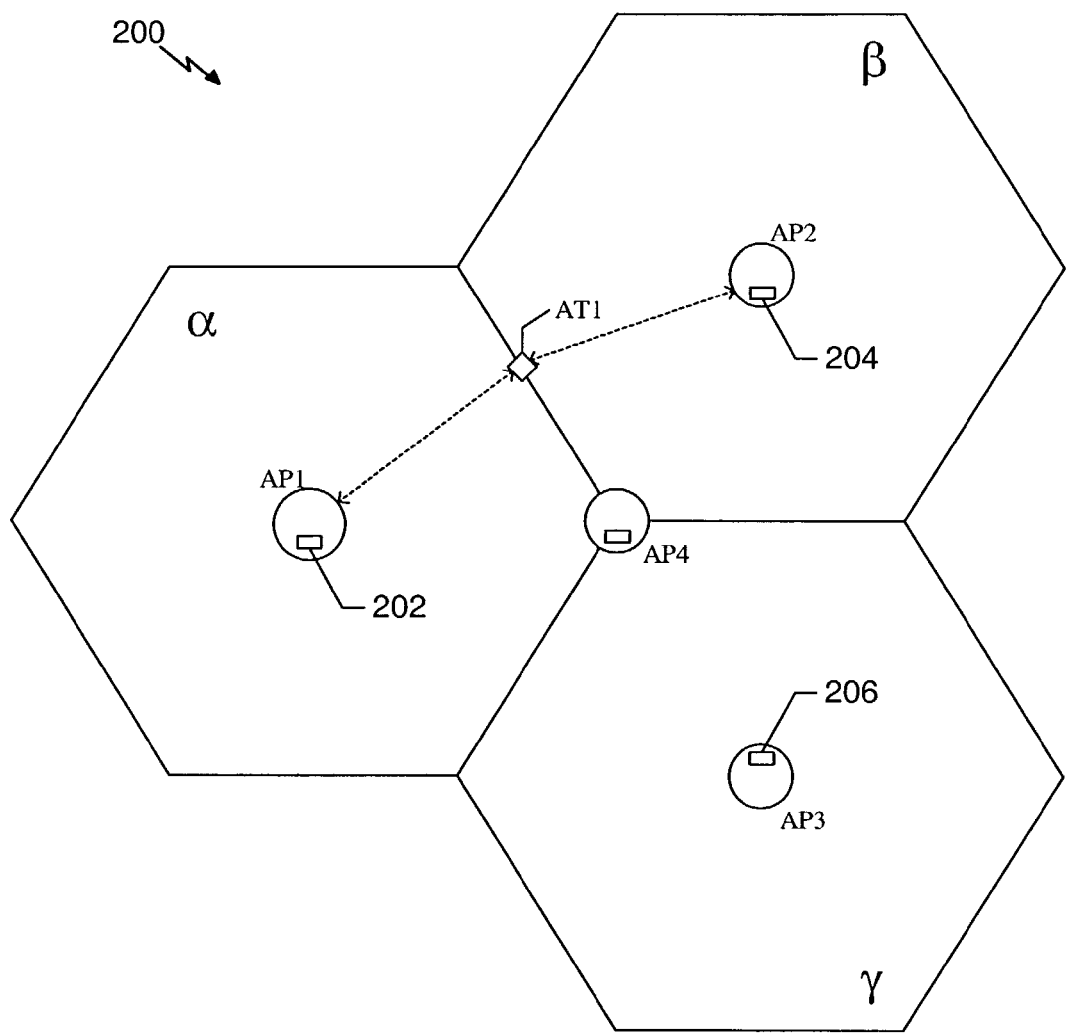
FIG. 2 illustrates a high data rate (HDR) system having a plurality of cells α, β, γ, in accordance with an exemplary embodiment.

FIG. 2 illustrates a high data rate (HDR) system 200 having a plurality of cells $\alpha$, $\beta$, $\gamma$ (i.e., these cells have base station transceivers with time biases of $\alpha$, $\beta$, and $\gamma$), in accordance with an exemplary embodiment. An HDR remote station AT1, referred to herein as an access terminal, may be mobile or stationary, and may communicate with one or more HDR base stations AP1–AP3, referred to herein as access points. However, in some embodiments, the HDR system 200 may be similarly configured with a plurality of sectors where the access terminal AT1 communicates with one or more sectorized antennas within the access point AP4.

In the exemplary embodiment of FIG. 2, the access terminal AT1, which is located near the common edge of the cells $\alpha$ and $\beta$, may be receiving data from cell $\alpha$ and/or cell $\beta$. However, because the transceivers in cells $\alpha$, $\beta$, and $\gamma$ are time biased and are scheduled by the schedulers 202, 204, 206 to transmit at different transmission times, data may be received at the access terminal AT1 with significantly reduced inter-cell interference than the conventional configuration described in FIG. 1.

Figure 3:
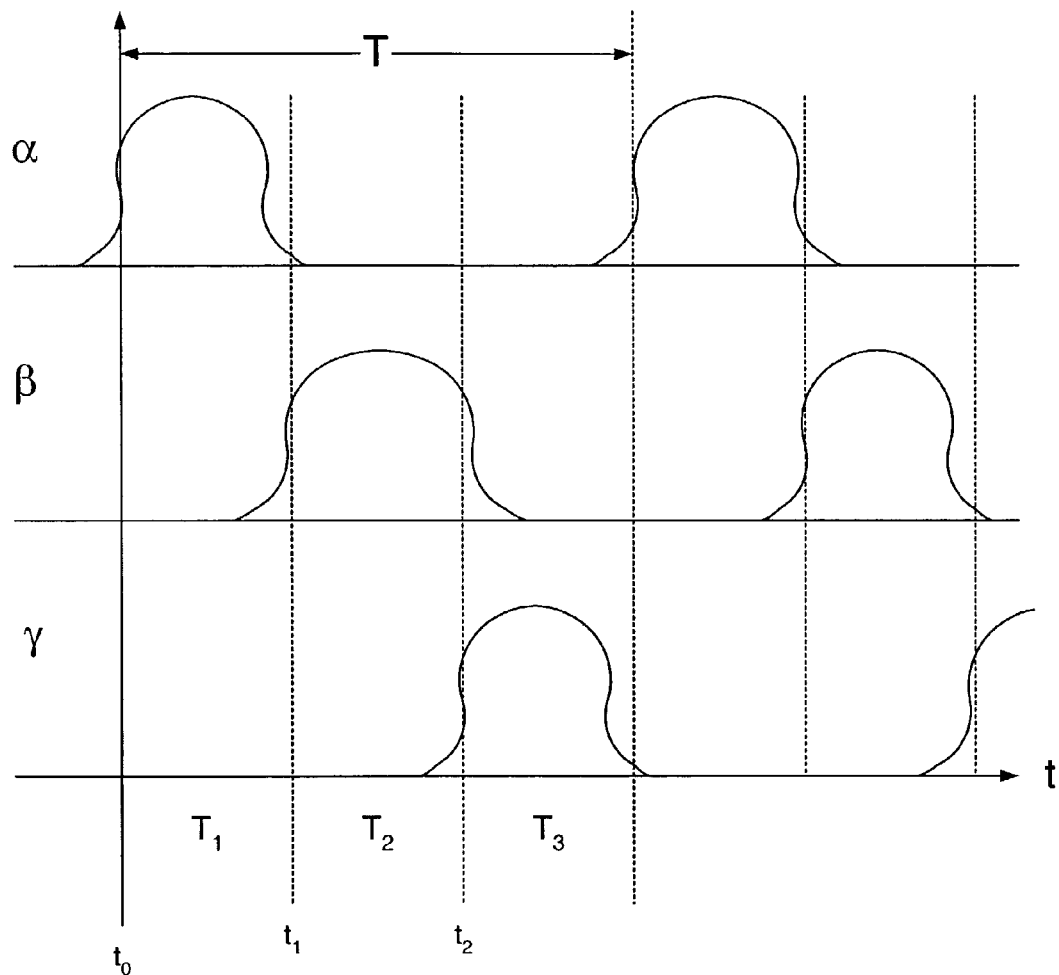
FIG. 3 illustrates an exemplary embodiment of a biasing and scheduling technique that incorporates knowledge about the data transmission load of the link.

An exemplary embodiment of biasing in accordance with the invention is illustrated in FIG. 3. In the exemplary embodiment, the time period (T) is divided into three sub-periods or slots $T_1$, $T_2$, $T_3$. In one embodiment, the division of the time period T is based on the average transmission load on the access point transceivers of adjacent cells $\alpha$, $\beta$, $\gamma$, which is approximately 33% for the illustrated embodiment. The average transmission load may be calculated by combining the transmission load of each transceiver and dividing the sum by the number of adjacent cells considered for transceiver biasing. The transmission load can be easily obtained in a way known to those skilled in the art. In other embodiments, the time period T may be divided into greater or lesser number of sub-periods. Although this embodiment uses average transmission load of the transceivers, other transmission parameters such as median load or some percentage of maximum transmission message length may be used to bias the transceivers.

In the exemplary embodiment, the biasing biases transceivers in the adjacent cells $\alpha$, $\beta$, and $\gamma$ so that the transceiver with a time bias of $\alpha$ is most likely to transmit its data during the time slot $T_1$ than other time slots $T_2$ or $T_3$, the transceiver with a time bias of $\beta$ is most likely to transmit its data during the time slot $T_2$ than other time slots $T_1$ or $T_3$, and the transceiver with a time bias of $\gamma$ is most likely to transmit its data during the time slot $T_3$ than other time slots $T_1$ or $T_2$. Hence, a probability function is assigned for each transceiver to transmit at each time slot. The probability function for the transceiver to transmit during the biased time slot is chosen to be 1 or most likely to occur. For each time slot, the scheduler schedules to transmit data for that transceiver by comparing a random number with the probability function determined for that time slot. If the probability function is greater than or equal to the random number, then the scheduler schedules the transceiver to transmit during that time slot.

The biasing of the adjacent-cell transceivers is typically executed through the configuration of the corresponding schedulers. Therefore, in the exemplary embodiment of FIG. 3, the biasing element biases the transceivers in the cells $\alpha$, $\beta$, and $\gamma$ by configuring the schedulers to schedule the respective transceivers to start their biased transmissions at $t_0$, $t_1$, and $t_2$, respectively, instead of scheduling all transceivers to start the transmission at $t_0$. Thus, during substantial portions of the T period, there is only one transceiver (among transceivers of the adjacent cells) transmitting data packets at any particular time or period. Furthermore, even if the average transmission load is greater than 33%, the schedulers may appropriately schedule the transceivers so that most of the time only one transceiver is transmitting at any particular time or period. Accordingly, in the exemplary embodiment, it can be seen that by biasing each cell transceiver by T/3, interference between the cells may be significantly reduced and signal-to-interference-and-noise ratio (SINR) may be increased. In one embodiment, the time period (T) may be divided into equal sub-periods. In another embodiment, the time period (T) may be divided into unequal sub-periods, which may be determined by the average transmission load of adjacent cells. In a further embodiment, derivation of the sub-periods may be determined dynamically and appropriately adjusted. The time period (T) may typically be selected to be approximately 1.67 milliseconds, which is a typical scheduling period for a CDMA system.

Figure 4:
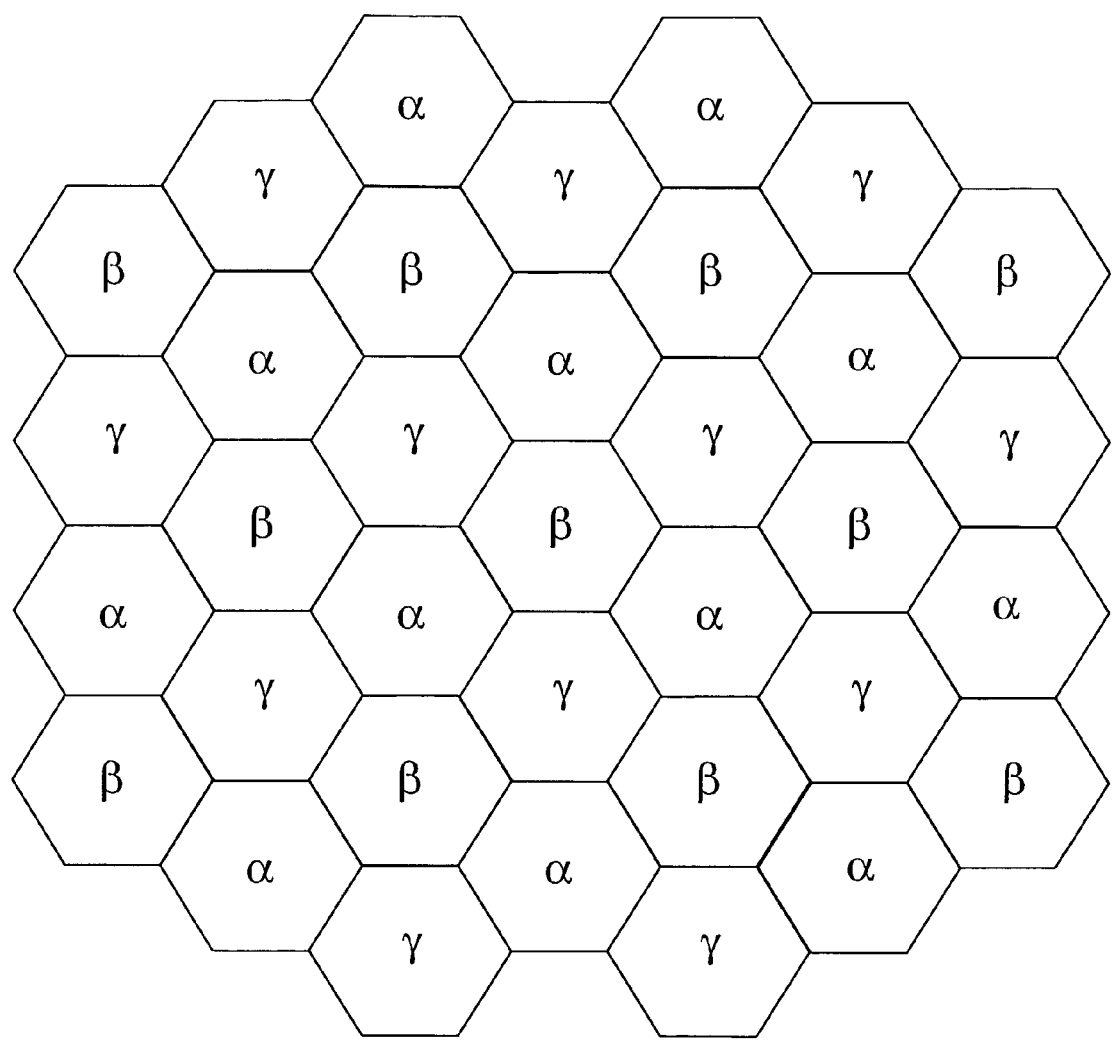
FIG. 4 shows an exemplary cell distribution pattern achieved with a biasing and scheduling technique described in FIG. 3 (three adjacent cells biased)

FIG. 4 shows an exemplary cell distribution pattern achieved with the above-described biased scheduling technique. The exemplary distribution pattern shows how the cells can be arranged so that the transmission period of the access point transceiver in each cell is substantially isolated in a time slot and no adjacent-cell transceivers are transmitting substantially simultaneously. Isolation of each cell transceiver is provided by biasing the transceiver into a selected time slot so that the probability of the transceiver transmitting during the selected time slot is substantially higher than the probability of the transceiver transmitting during other time slots.

The distribution pattern shown in FIG. 4 is similar to a frequency reuse pattern having three channels (i.e., k=3).

Figure 5:
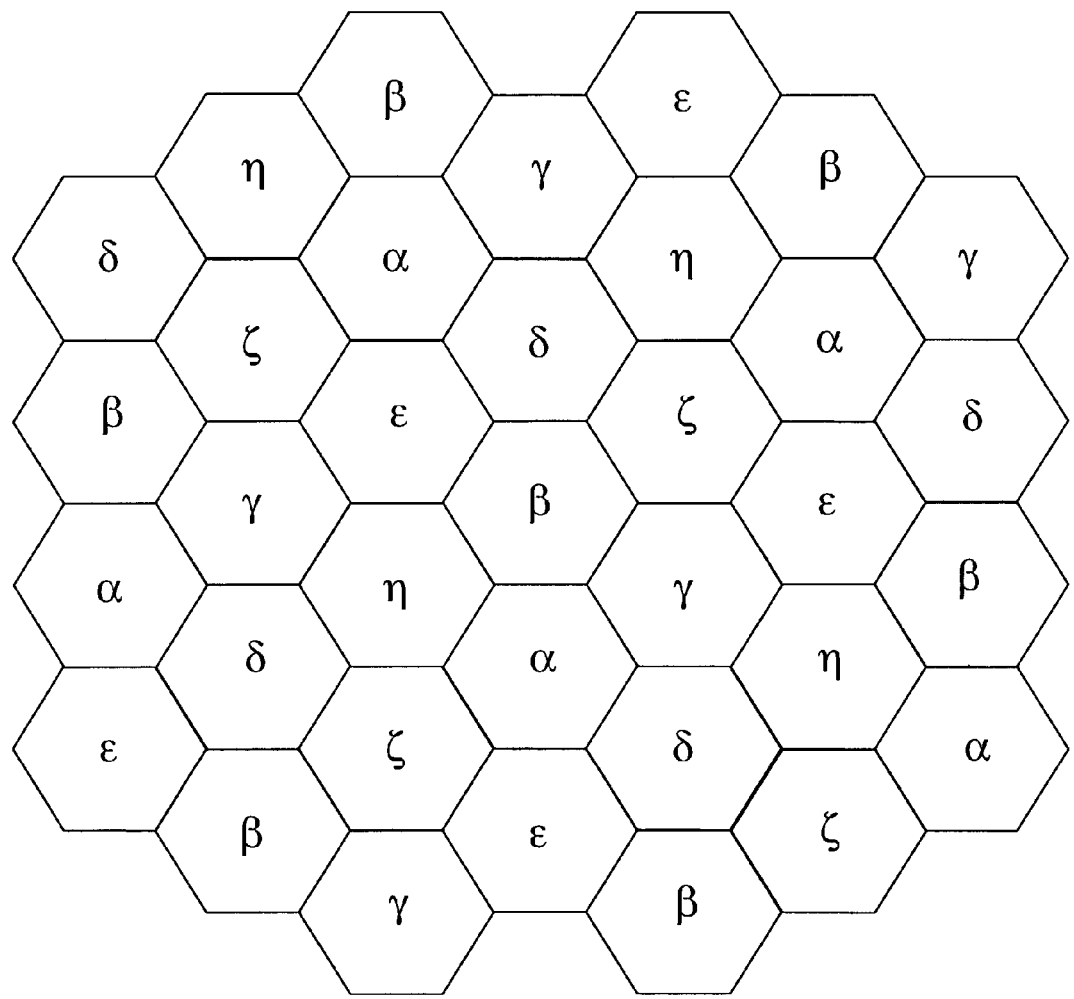
FIG. 5 shows another embodiment of a cell distribution pattern achieved with a biasing and scheduling technique described in FIG. 3 (seven adjacent cells biased)

Hence, this pattern may provide interference distribution that is comparable to the frequency reuse pattern having three channels by adding a bias for each cell transceiver without any additional hardware. However, some functions may be performed in hardware. In another embodiment, the transceivers may be biased into more or less than three time slots. For example, as shown in FIG. 5, the cell distribution pattern may be configured similarly to that of a commonly-used frequency reuse pattern of 7 by biasing the cell transceivers into seven time slots. Hence, it can be seen that the transceivers may be biased into any appropriate number of time slots.

Figure 6:
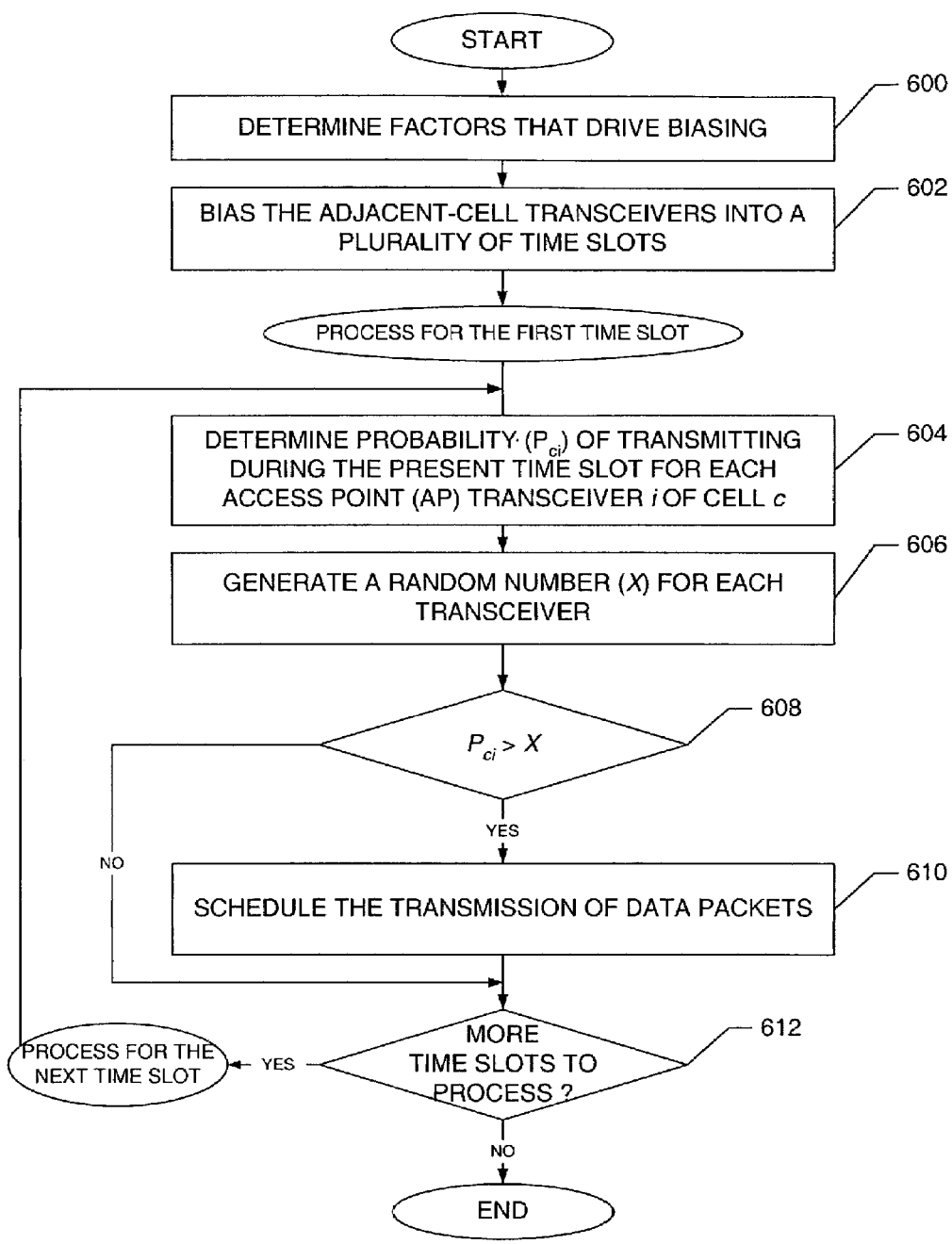
FIG. 6 is a flowchart illustrating an exemplary embodiment of the biasing and scheduling technique described in FIG. 3.

FIG. 6 is a flowchart illustrating processing of an exemplary embodiment of the above-described biasing and scheduling. Initially, a number of factors that drives the biasing is determined at 600. The factors may include the number of adjacent-cell transceivers to be biased, the biasing metric (e.g., parameters such as an average transmission load of the cells used to subdivide a transmission period), and the number of time subdivisions. At 602, the transceivers are biased into a plurality of time slots by using the factor determined at 600, such that the biasing adjusts the timing of transmission, which reduces interference among adjacent cells. In one embodiment, the biasing involves dividing the total transmission time period (e.g., T in FIG. 3) into an appropriate number of sub-periods or time slots based on the average transmission load of the adjacent cells, as described above. The appropriate number of sub-periods may be determined by the number of adjacent-cell transceivers to be biased such that each transceiver can be assigned to a different sub-period.

As described above, the biasing biases transceivers in the adjacent cells so that a particular transceiver with a time bias is configured as most likely to transmit its data during a selected or biased time slot. In particular, the biasing element configures a scheduler corresponding to the particular transceiver to schedule transmission of data for the transceiver within the selected or biased time slot with a higher transmission probability than within other non-selected time slots. Each transceiver is then scheduled by a scheduler to transmit data in the selected time slot as described below.

Figure 7A:
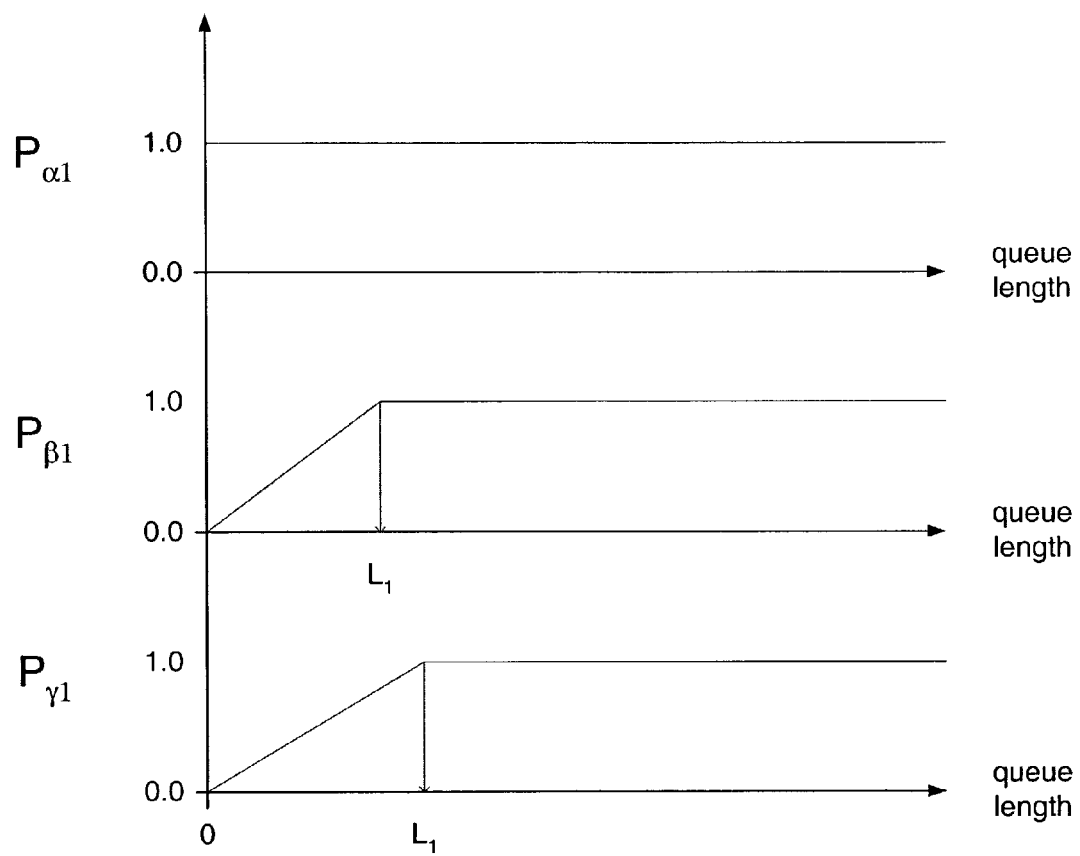
FIG. 7A illustrates an exemplary implementation for generating probabilities ($P_{\alpha 1}$, $P_{\beta 1}$, $P_{\gamma 1}$) of transmitting data packets for cell transceivers with time biases α, β, γ, during a biased time slot $T_1$.

The transmission probabilities are generated, in the schedulers, at 604, for access point transceivers of the adjacent cells during a selected time slot of the plurality of time slots. For example, FIG. 7A illustrates an exemplary implementation for generating transmission probabilities ($P_{\alpha 1}$, $P_{\beta 1}$, $P_{\gamma 1}$) for cell transceivers with time biases of $\alpha$, $\beta$, $\gamma$, during a selected time slot for an access point transceiver with a time bias $\alpha$ (i.e., $T_1$ in FIG. 3). FIG. 7A shows that during this biased time slot ($T_1$), the transmission probability ($P_{\alpha 1}$) for the access point transceiver in cell $\alpha$ is configured to be 1, while the transmission probabilities ($P_{\beta 1}$, $P_{\gamma 1}$) for access point transceivers in cells $\beta$ and $\gamma$, respectively, are based on such parameters as queue lengths of the data packets in those transceivers. Hence, the transmission probabilities $P_{\beta 1}$ and $P_{\gamma 1}$, are increased in response to the increase in queue lengths of the data packets in the transceivers of the cells $\beta$ and $\gamma$, respectively. Accordingly, during the biased time slot $T_1$, the transceiver in cell $\alpha$ will always utilize its selected time slot for transmission, whereas transceivers in cells $\beta$ and $\gamma$ will transmit based on their respective queue lengths.

In particular, the transmission probabilities $P_{\beta 1}$ and $P_{\gamma 1}$ for transceivers in cells $\beta$ and $\gamma$, respectively, increase from a probability of 0.0 at queue length equal to 0 to a probability of 1.0 at some queue length $L_1$. This is done so that the transceiver that is not biased to transmit during the selected time slot (i.e., transceivers in cells $\beta$ and $\gamma$ in this case) will most likely not transmit if the queue length for the transceiver is relatively low. However, if the queue length for the transceiver not biased to transmit during the selected time slot is relatively high so that the queues waiting to be transmitted may adversely affect the operation of the transceiver, the transmission probability may be adjusted to allow the non-biased transceiver to transmit during the selected time slot. Thus, the queue length limit $L_1$ may be adjusted to provide substantially efficient configuration of queues and memories in the transceiver.

Furthermore, as can be seen in FIG. 7A, the selection of $L_1$ determines the slope of the transmission probability. Therefore, the selection of $L_1$, and hence, the slope of the transmission probability curve can be configured as a function of some parameter such as the quality of service (QoS) of data traffic. In this case, the data traffic that is not tolerant of delay may get a higher priority, and thus a steeper slope, than other data traffic. For example, for non-delay-sensitive transmissions such as downloading of data, a low value may be used for the slope (i.e., high value for $L_1$). For delay-sensitive transmissions such as real-time gaming, a high value may be used for the slope (i.e., low value for $L_1$).

Figure 7B:
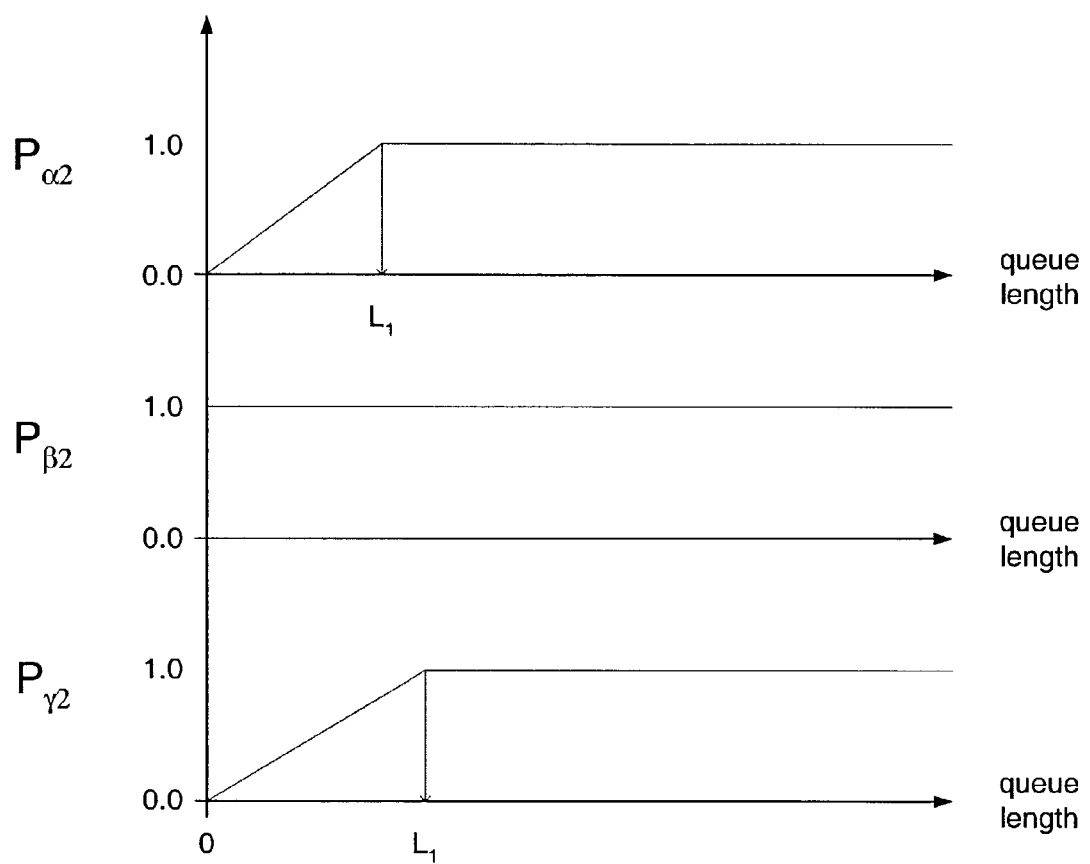
FIG. 7B illustrates an exemplary implementation for generating probabilities ($P_{\alpha 2}$, $P_{\beta 2}$, $P_{\gamma 2}$) of transmitting data packets for cell transceivers with time biases α, β, γ, during a biased time slot $T_2$.
Figure 7C:
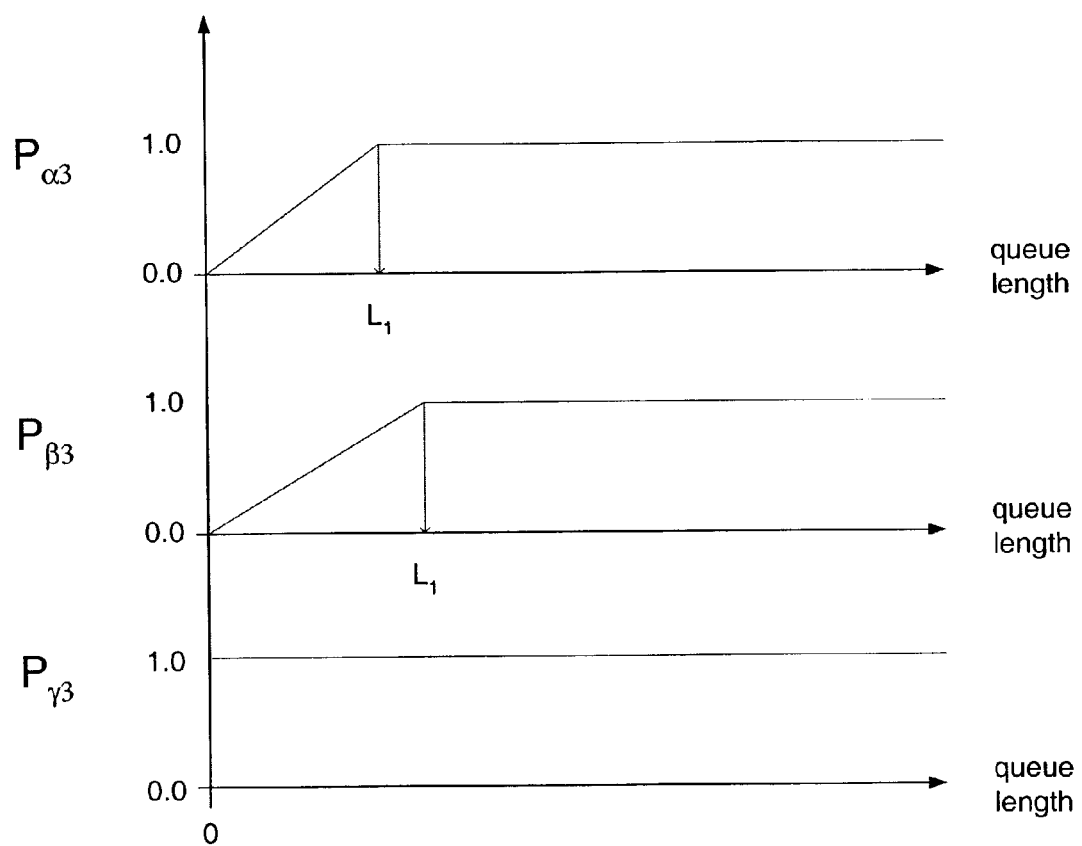
FIG. 7C illustrates an exemplary implementation for generating probabilities ($P_{\alpha 3}$, $P_{\beta 3}$, $P_{\gamma 3}$) of transmitting data packets for cell transceivers with time biases α, β, γ, during a biased time slot $T_3$.

Transmission probabilities for transceivers during biased time slots $T_2$ and $T_3$ may be generated similarly to the process described above for the biased time slot $T_1$, as shown in FIGS. 7B and 7C, respectively. Therefore, for example, to obtain probabilities of transmitting data packets during the biased time slot $T_2$, $P_{\beta 2}$ is held at 1 while $P_{\alpha 2}$ and $P_{\gamma 2}$ are determined based on the queue lengths of the transceivers in cells $\alpha$ and $\gamma$, respectively. Accordingly, it can be seen that for the transceiver with a time bias of $\alpha$, the transmission probability ($P_{\alpha 1}$) is highest during the selected or biased time slot $T_1$, which is equal to 1. During $T_2$ and $T_3$, the transmission probabilities ($P_{\alpha 2}$ and $P_{\alpha 3}$) depend on parameters such as queue length of the transceiver.

The scheduling for the selected time slot further includes generating a random number X, between 0 and 1, at 606. The random number may be generated based on a uniform distribution. For each access point transceiver of the adjacent cells, the generated random number X is then compared to the generated transmission probability, at 608, to determine if that particular transceiver within a group of transceivers of the adjacent cells should transmit during the selected time slot. If the generated transmission probability is greater than the generated random number X, the scheduler schedules transmission of data packets, at 610. Scheduling in this way ensures that most of the time only the biased transceiver is transmitting during the selected time slot for that biased transceiver.

Although the operations or procedures described for the biasing and scheduling were presented in a particular sequence, the operations/procedures may be interchanged without departing from the scope of the invention.

Figure 8:
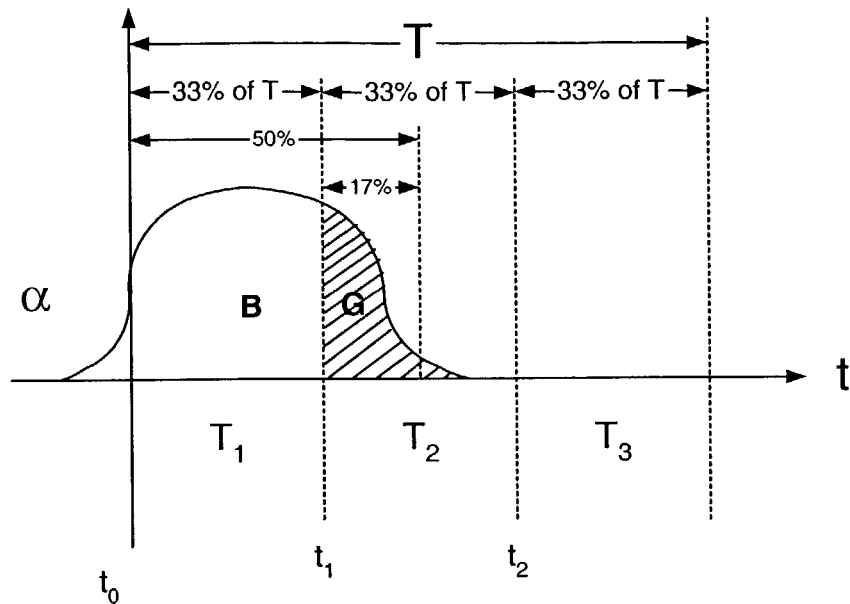
FIG. 8 illustrates an exemplary embodiment of an intra-cell scheduling technique that incorporates knowledge about strength of coverage areas for access terminals.
Figure 9:
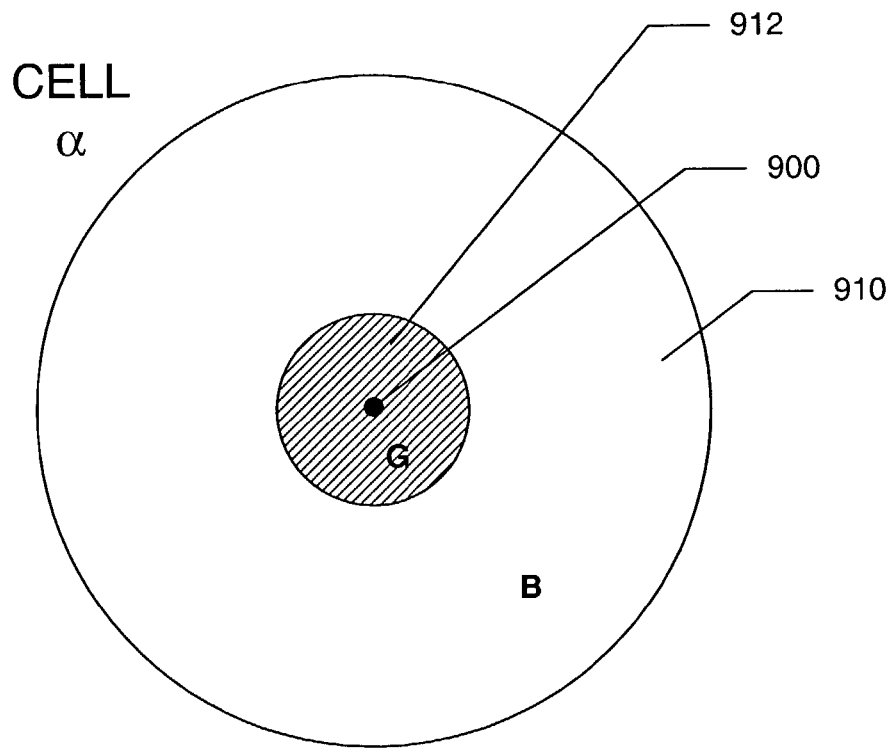
FIG. 9 shows coverage areas for access terminals within a particular cell.

FIGS. 8 and 9 illustrate an additional embodiment, which extends the concept of cell transceiver bias among adjacent cells. The additional embodiment may be referred to as an "intra-cell" bias (as opposed to the "intercell" bias described above in conjunction with FIGS. 2 through 7) because the transmission times for data packets from an access point transceiver to different access terminals within a particular cell is determined by the location/coverage of the access terminals.

For example, an access point transceiver 900 shown in FIG. 9 covers cell $\alpha$ with transmission load of approximately 50% (see FIG. 8). That is, the transceiver 900 transmits approximately 50% of the time in one transmission period T. However, in the illustrated embodiment, the time period (T) is divided into three sub-periods (e.g., $T_1$, $T_2$, $T_3$), each sub-period covering about 33% of the transmission period T. This may be due to the fact that in biasing the adjacent cells, the transmission period was divided into three sub-periods to separate the transmission of 3 adjacent cells. Approximately 17% (50%–33%) of the data transmission (for the transceiver in cell α) that starts at $T_1$ overlaps with transmission of data in a biased transceiver of an adjacent cell during $T_2$. The intra-cell bias operates to minimize the effects of adjacent cell interference during this 17% of the time by appropriately biasing the transmission of data packets to different access terminals.

In the illustrated embodiment of FIGS. 8 and 9, the scheduler schedules transmission of data packets such that transmissions from a source terminal or access point transceiver 900 to access terminals within a weak coverage area (B) 910 are given relatively high probabilities for transmission during the time slot $T_1$ that is allotted to the source terminal. Transmissions to access terminals within a good coverage area (G) 912 relative to the source terminal or transceiver 900 are given relatively low probabilities for transmission during the allotted time slot $T_1$, so that transmissions to these access terminals, within the good coverage area, would more likely be made during the 17% period (within $T_2$) where there may be interference with transmission of data from an adjacent cell. However, since access terminals in the good coverage area (G) 912 are more likely to be near the center area of cell α, near the transceiver 900, the interference from an adjacent cell will be less likely to adversely affect these transmissions.

Figure 10:
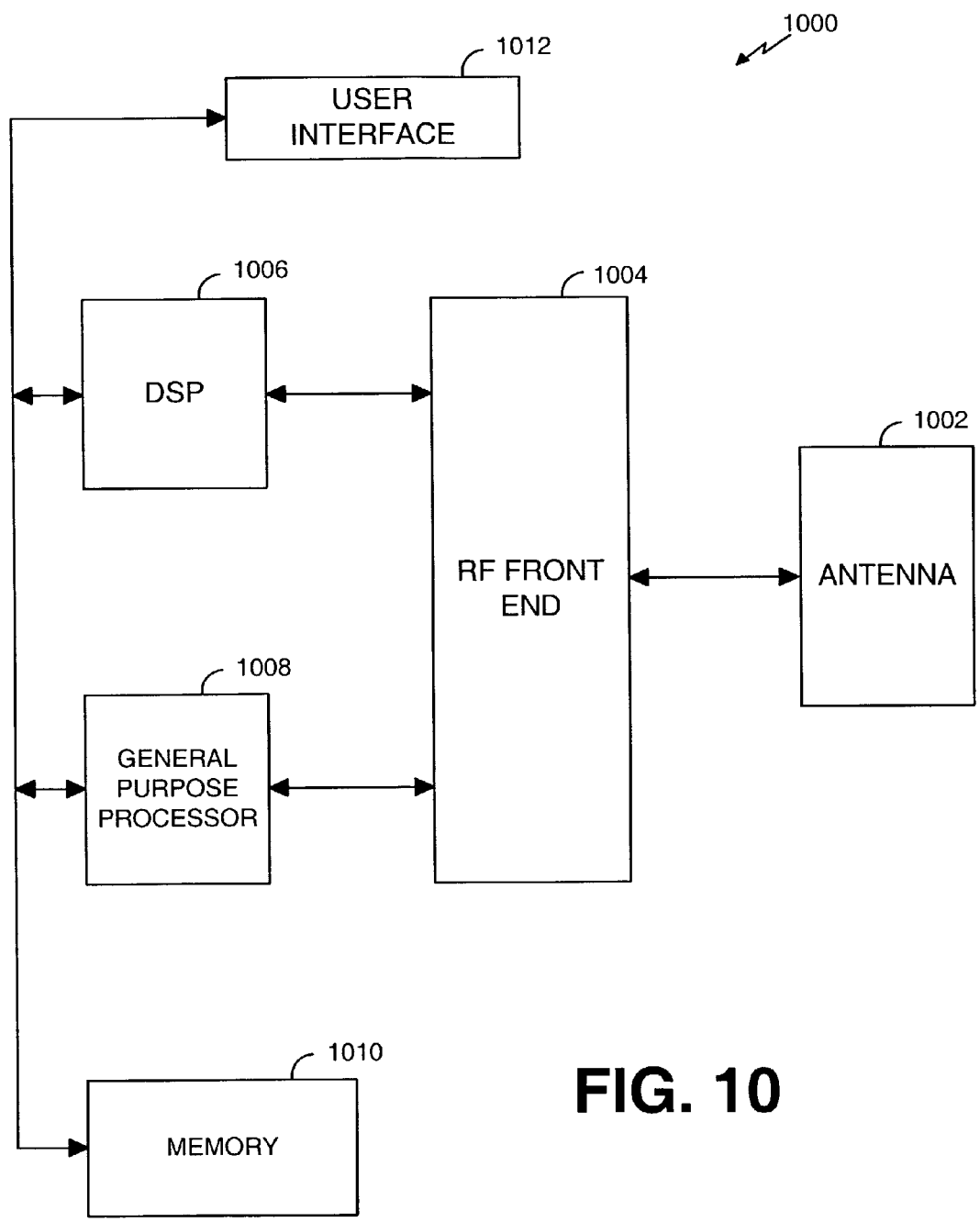
FIG. 10 is a block diagram of an access terminal in accordance with an exemplary embodiment.

FIG. 10 is a block diagram of an access terminal 1000 constructed in accordance with the present invention. The access terminal 1000 includes an antenna 1002, a radio frequency (RF) front end 1004, a digital signal processor (DSP) 1006, a general purpose processor 1008, a memory device 1010, and a user interface 1012 such as a display device for providing a graphical user interface.

In accordance with the processing described above, the antenna 1002 receives forward link signals from one or more access point transceivers that are scheduled by the scheduler in the access point. The signals are appropriately amplified, filtered and otherwise processed by the RF front end 1004. The output from the RF front end 1004 is then applied to the DSP 1006. The DSP 1006 decodes the received forward link signals. In addition, the DSP 1006 provides an indication as to the relative quality of the received forward link. The indication of relative quality is stored in the memory 1010. The General Purpose Processor 1008 is coupled to the DSP 1006 and to the memory 1010. The General Purpose Processor 1008 reads the indications of relative quality from the memory 1010 and determines the rate at which each received forward link can support data, and determines which forward link can support the highest data rate. The RF front end 1004 processes the reverse link output signal and couples the reverse link output signal to the antenna for transmission to each access point transceiver capable of receiving the signal.

Figure 11:
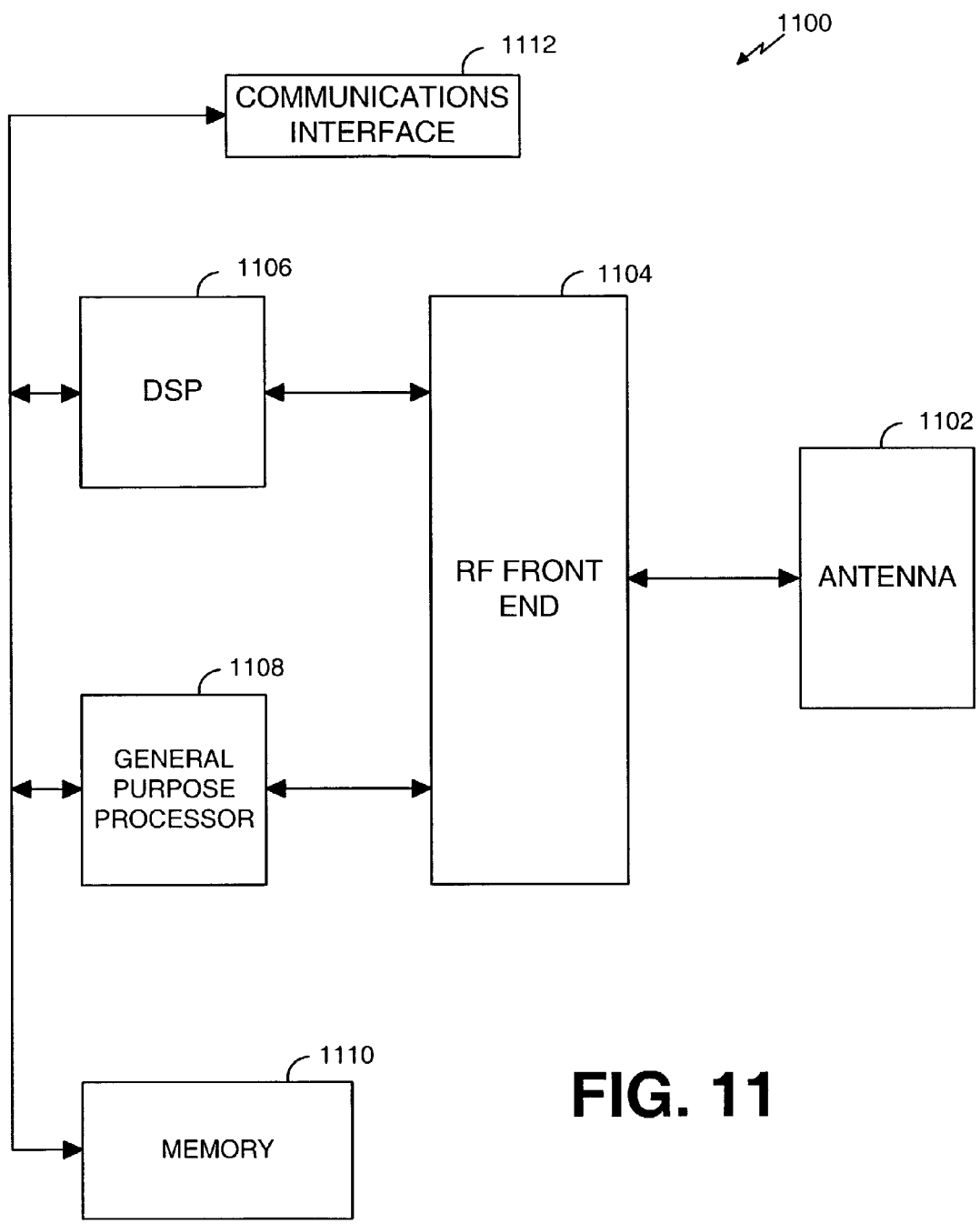
FIG. 11 is a block diagram of an access point in accordance with an exemplary embodiment.

FIG. 11 is a block diagram of an access point 1100 in accordance with an exemplary embodiment of the present invention. The access point 1100 includes a transceiver, such as an antenna 1102 and a radio frequency (RF) front end 1104. The access point 1100 further includes a digital signal processor (DSP) 1106, a general purpose processor 1108, a memory device 1110, and a communication interface 1112.

In the exemplary embodiment, the antenna 1102 receives reverse link signals that have been transmitted from nearby access terminals 1000. The antenna couples these received signals to an RF front end 1104 which filters and amplifies the signals. The signals are coupled from the RF front end 1104 to the DSP 1106 and to the general purpose processor 1108 for demodulation, decoding, further filtering, etc. In addition, the DSP 1106 determines the strength of the transmitted signal power from the access terminal 1000 for each received reverse link signal. It should be noted that the access point 1100 typically receives reverse link signals from more than one access terminal 1000 at a time.

The general purpose processor 1108 communicates to the DSP 1106 the amount of power that should be allocated to each reverse link. Based upon the allocation of power, the DSP 1106 modulates and encodes the forward link signals to be transmitted by the access point 1100. The signal is coupled to the RF front end 1104. The RF front end couples the signal to the antenna 1102, which transmits the forward link signal to the access terminal. The transmission schedule of the forward link signal from the access point transceiver to the access terminal 1000 is determined by the scheduling technique described in conjunction with FIGS. 1 through 9. Thus, in one embodiment, the scheduler may be implemented as a program that is executed by the general purpose processor 1108.

Figure 12:
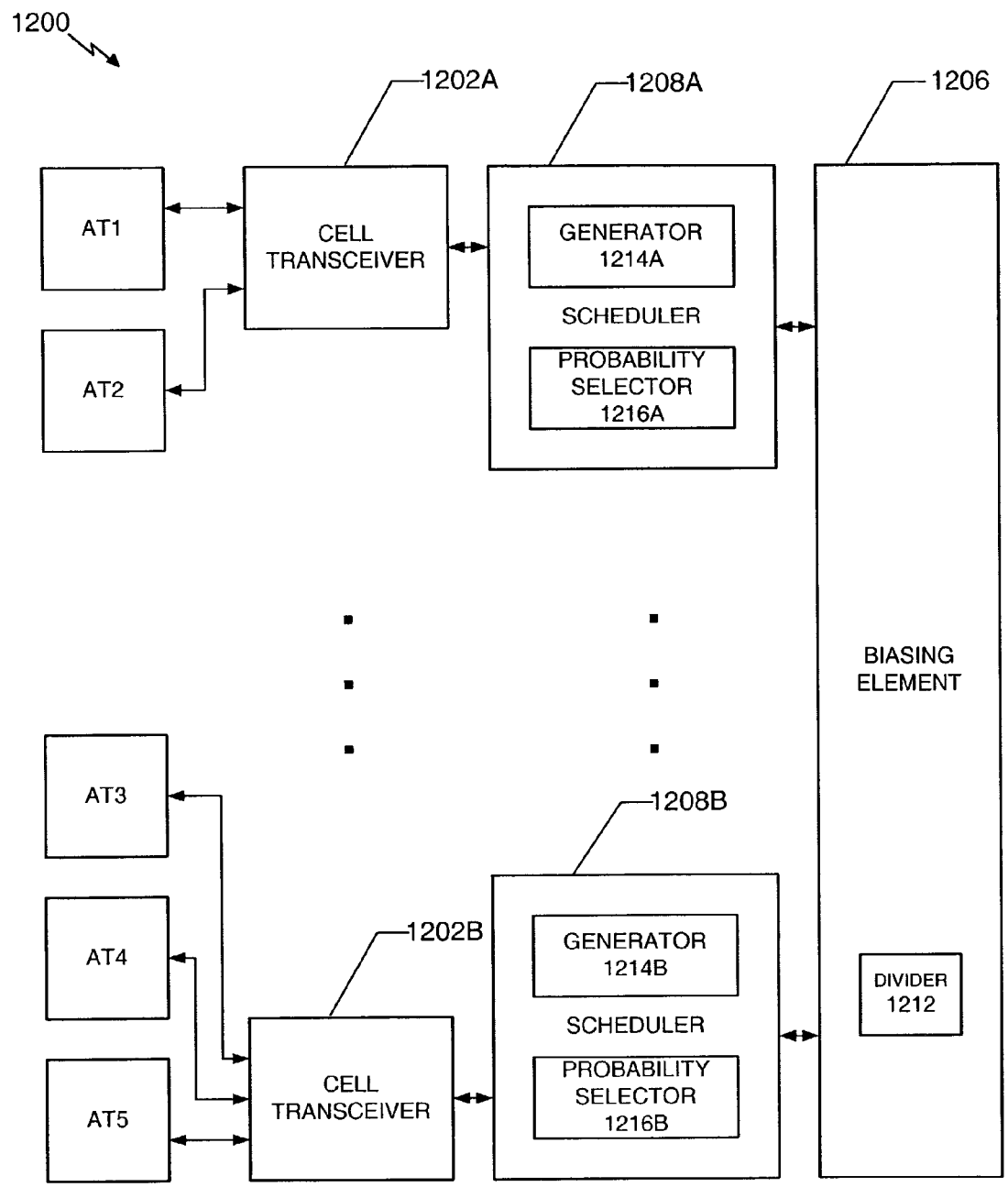
FIG. 12 is a block diagram of a wireless communication system in accordance with an exemplary embodiment.

FIG. 12 is a block diagram of a wireless communication system 1200 in accordance with an exemplary embodiment of the present invention. The system 1200 is similar to the biased system 200 shown in FIG. 2 but is shown in more detail. The system 1200 includes a plurality of access point transceivers 1202, a plurality of schedulers 1208, a biasing element 1206, and a plurality of access terminals AT1-AT5. Two transceivers 1202A and 1202B are explicitly shown in FIG. 12. However, any number of transceivers can be included in the system 1200. Further, two corresponding schedulers 1208A and 1208B are explicitly shown. However, any number of schedulers can be included in the system 1200. The biasing element 1206 biases transceivers 1202 into a plurality of time slots to reduce the interference among adjacent cells. The biasing element 1206 includes a divider 1212 to divide a transmission period into the plurality of time slots based on an average transmission load of the adjacent cells. Each scheduler 1208 schedules to transmit data packets during a selected time slot that is distinct from each other. The scheduler 1208 includes a generator 1214 and a plurality of probability selectors 1216. The generator 1214 generates transmission probabilities for the transceivers 1202 during the selected time slot. One of the probability selectors 1216 sets a probability curve for the transceiver corresponding to the selected time slot at a constant level of maximum probability. Other selectors 1216 configure probability curves for the other transceivers corresponding to time slots other than the selected time slot to be based on such parameters as queue lengths of data packets in the other transceivers. In the illustrated embodiment, the plurality of selectors 1216 includes a calculator to determine the slopes of the probability curves as a function of quality of service of data traffic. Finally, the transceivers 1202 are scheduled by the schedulers 1208 to transmit to access terminals AT.

Those of skill in the art will understand that information and signals can be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
biasing access point transceivers in adjacent cells into a plurality of time slots such that the biasing adjusts transmission times of the access point transceivers to reduce interference among the transceivers in the adjacent cells; and
scheduling each transceiver to transmit data during a biased time slot of the plurality of time slots that is distinct from slots selected by other transceivers, wherein the scheduling includes:
generating transmission probabilities for the transceivers during the selected time slot, and wherein the generating transmission probabilities includes:
setting a probability curve for a first transceiver corresponding to the selected time slot at a constant level of maximum probability; and
configuring probability curves for other transceivers corresponding to time slots other than the selected time slot to be based on queue lengths of data packets in the other transceivers.

2. The method of claim 1, wherein the biasing includes:
dividing a transmission period into the plurality of time slots.

3. The method of claim 2, wherein the dividing is based on an average transmission load of the adjacent cells.

4. The method of claim 1, wherein the biasing includes:
adjusting transmission times of the access point transceivers so that a transceiver is most likely to transmit data during the selected time slot than other slots in the plurality of time slots.

5. The method of claim 1, wherein the configuring probability curves includes:
determining slopes of the probability curves as a function of quality of service of data traffic.

6. The method of claim 5, wherein the determining slopes of the probability curves includes:
selecting steeper slopes for delay sensitive data traffic than for non-delay sensitive data traffic.

7. A method, comprising:
biasing access point transceivers in adjacent cells into a plurality of time slots such that the biasing adjusts transmission times of the access point transceivers to reduce interference among the transceivers in the adjacent cells; and
scheduling each transceiver to transmit data during a biased time slot of the plurality of time slots that is distinct from slots selected by other transceivers, wherein the scheduling includes:
generating transmission probabilities for the transceivers during the selected time slot,
generating a random number; and
comparing the random number with the transmission probabilities for the transceivers.

8. The method of claim 7, wherein the scheduling includes:
transmitting data such that a probability of data transmission during the selected time slot is higher than a probability of data transmission during other time slots, when the transmission probability is greater than the random number.

9. A method, comprising:
biasing access point transceivers in adjacent cells into a plurality of time slots such that the biasing adjusts transmission times of the access point transceivers to reduce interference among the transceivers in the adjacent cells;
scheduling each transceiver to transmit data during a biased time slot of the plurality of time slots that is distinct from slots selected by other transceivers; and
performing an intra-cell bias such that, within a cell, transmission to remote stations within a weak coverage area is provided with a higher transmission probability during the selected time slot than during other time slots.

10. A method for biasing and scheduling transmission of data for access point transceivers in a cellular network, comprising:

biasing each transceiver of the transceivers in adjacent cells into a time slot;
generating transmission probabilities for the transceivers in the adjacent cells during the biased time slot;
generating a random number;
comparing the random number with the transmission probabilities for each transceiver during the corresponding time slot for the transceiver; and
transmitting data packets when the transmission probability is greater than the random number such that during a substantial portion of the biased time slot only one transceiver that is biased to transmit during the biased time slot is transmitting.

11. A computer readable media comprising:
code for causing a computer to bias access point transceivers in adjacent cells into a plurality of time slots such that the biasing adjusts transmission times to reduce interference among the transceivers of the adjacent cells; and
code for causing a computer to schedule each transceiver to transmit data during a selected time slot of the plurality of time slots that is distinct from slots selected by other transceivers, wherein the code for causing a computer to schedule further includes:
code for causing a computer to generate transmission probabilities for the transceivers during the selected time slot;
code for causing a computer to generate a random number; and
code for causing a computer to compare the random number with the transmission probabilities for the transceivers.

12. A wireless communication system comprising:
a plurality of transceivers, including a first transceiver and other transceivers, located in adjacent cells;
a biasing element configured to bias each transceivers in the adjacent cells into a time slot, the biasing element operating to adjust transmission times to reduce interference among adjacent cells; and
a plurality of schedulers, each scheduler corresponding to each transceiver, each scheduler transmits data during a biased time slot of the plurality of time slots that is distinct from slots selected by other transceivers, wherein each scheduler includes:
a generator for generating transmission probabilities for the transceivers during the selected time slot, and wherein the generator includes:
a plurlity of probability selectors to set a probability curve for the first transceiver corresponding to the selected time slot at a constant level of maximum probability, and to configure probability curves for the other transceivers corresponding to time slots other than the selected time slot to be based on queue lengths of data packets in the other transceivers.

13. The system of claim 12, wherein the biasing element includes:
a divider to divide the transmission period into the plurality of time slots based on an average transmission load of the adjacent cells.

14. The system of claim 12, wherein the plurality of probability selectors includes:
a calculator to determine slopes of the probability curves as a function of quality of service of data traffic.

15. A wireless communication system comprising:
means for biasing access point transceivers in adjacent cells into a plurality of time slots such that the biasing adjusts transmission times to reduce interference among the transceivers of the adjacent cells; and
means scheduling each transceiver to transmit data during a biased time slot of the plurality of time slots that is distinct from slots selected by other transceivers, wherein the means for scheduling includes:
means for generating transmission probabilities for the transceivers during the selected time slot, and wherein the means for generating includes:
means for selecting probabilities to set a probability curve corresponding to the selected time slot at a constant level maximum probability, and to configure probability curves corresponding to time slots other than the selected time slot to be based on queue lenghts of data packets.

16. The system of claim 15, wherein the means for biasing includes:
means for dividing the transmission period into the plurality of time slots based on an average transmission load of the adjacent cells.

17. A wireless communication system comprisig: means for biasing each transceiver of the transeivers in adjacent cells into a time slot;
means for generating transmission probabilities for the transceivers in the adjacent cells during the biased time slot;
means for generating a random number;
means for comparing the random number with the transmission probabilities for each transceiver during the corresponding time slot for the transceiver; and
means for transmitting data packets when the transmission probability is greater than the random number such that during a substantial portion of the biased time slot only one transceiver that is biased to transmit during the biased time slot is transmitting.

* * * * *